(12) United States Patent
Miller et al.

(10) Patent No.: US 7,117,497 B2
(45) Date of Patent: Oct. 3, 2006

(54) BUDGET TRANSFER MECHANISM FOR TIME-PARTITIONED REAL-TIME OPERATING SYSTEMS

(75) Inventors: Larry J. Miller, Black Canyon City, AZ (US); Aaron Larson, Shoreview, MN (US)

(73) Assignee: Honeywell International, Inc., Morristown, NJ (US)

( * ) Notice: Subject to any disclaimer, the term of this patent is extended or adjusted under 35 U.S.C. 154(b) by 885 days.

(21) Appl. No.: 10/008,147

(22) Filed: Nov. 8, 2001

(65) Prior Publication Data

US 2003/0088606 A1    May 8, 2003

(51) Int. Cl.
*G06F 9/46* (2006.01)

(52) U.S. Cl. .................... 718/102; 718/100

(58) Field of Classification Search ............ 718/1, 718/100–108
See application file for complete search history.

(56) References Cited

U.S. PATENT DOCUMENTS 6,466,898 B1 * 10/2002 Chan ..................... 703/17
6,792,445 B1 * 9/2004 Jones et al. ............. 718/107
2003/0069917 A1 * 4/2003 Miller .................... 709/105

FOREIGN PATENT DOCUMENTS

| WO | WO 9921083 A | 4/1999 |
| WO | WO 0062157 A | 10/2000 |
| WO | WO 03040884 A | 5/2003 |
| WO | WO 03044655 A | 5/2003 |

OTHER PUBLICATIONS

Ford, B et al, "CPU Inheritance Scheduling," Operating Systems Review (SIGOPS), ACM Headquarter, NY, US, vol. 30, No. Special Issue, Dec. 21, 1996, pp. 91-105, p. 94, l-hand col, line 29--r-hand col, line 12; p. 95, l-hand col, line 28--r-hand col, line 28; figure 3.
Haldar, S et al, "Fairness in Processor Scheduling in Time Sharing Systems," Operating Systems Review (SIGOPS). ACM Headquarter, NY, US, vol. 25, No. 1, 1991, pp. 4-18, the whole document.

* cited by examiner

*Primary Examiner*—Meng-Al T. An
*Assistant Examiner*—Kenneth Tang
(74) *Attorney, Agent, or Firm*—Ingrassia Fisher & Lorenz

(57) ABSTRACT

A method is provided for optimizing CPU budgets associated with at least first and second threads executable in a time-partitioned real-time operating system. The first thread having a first CPU budget is executed, and at least a portion of the first thread's unused CPU budget is transferred to the second thread.

20 Claims, 4 Drawing Sheets

BUDGET TRANSFER MECHANISM FOR TIME-PARTITIONED REAL-TIME OPERATING SYSTEMS

TECHNICAL FIELD

This invention relates generally to time-partitioned real-time operating systems, and more particularly, to a mechanism for transferring central processing unit (CPU) budget between threads in a time-partitioned real-time operating environment.

BACKGROUND OF THE INVENTION

Generally speaking, operating systems permit the organization of code such that conceptually, multiple tasks are executed simultaneously while, in reality, the operating system is switching between threads on a timed basis. A thread is considered to be a unit of work in a computer system, and a CPU switches or time multiplexes between active threads. A thread is sometimes referred to as a process; however, for purposes of this description, a thread is considered to be an active entity within a process; the process including a collection of memory, resources, and one or more threads.

A real-time operating system may provide for both space partitioning and time partitioning. In the case of space partitioning, each process is assigned specific memory and input/output regions. A process can access only memory assigned to it unless explicit access rights to other regions are granted; i.e. only if another process decides that it will share a portion of its assigned memory. In the case of time partitioning, there is a strict time and rate associated with each thread (e.g., a thread may be budgeted for 5000 ms every 25,000ms or forty times per second) in accordance with a fixed CPU schedule. A single, periodic thread could, for example, be assigned a real-time budget of 500 ms to accommodate worst-case conditions; i.e. involving all paths and all code. In many cases, however, the thread may need only a portion (e.g. 50 ms) of its 500 ms budget. The unused 450 ms is referred to as slack, and absent anything further, this unused time is wasted. To avoid this, some operating systems utilize slack pools to collect unused time that may then be utilized by other threads in accordance with some predetermined scheme; e.g. the first thread that needs the additional budget takes all or some portion of it. Alternatively, access to the slack pool is based on some priority scheme; e.g. threads that run at the same rate are given slack pool access priority. Still another approach could involve the use of a fairness algorithm. Unfortunately, none of these approaches result in the efficient and predictable use of slack.

Thus, it should be clear that time-partitioned real-time operating systems require that a specific CPU time budget be given to each thread in the system. This budget represents the maximum amount of time the thread can control the CPU's resources in a given period. A thread can run in a continuous loop until its CPU budget is exhausted, at which point an interrupt is generated by an external timer. The operating system then suspends the execution of the thread until the start of its next period, allowing other threads to execute on time. A thread execution status structure is provided to keep track of initial and remaining CPU budget. Since threads must be budgeted for worst-case conditions, only a portion of the budgeted CPU time is utilized in many cases thus reducing CPU efficiency, and slack mechanisms represent only a partial solution.

In view of the foregoing, it should be appreciated that it would be desirable to provide a method for maintaining the benefits of rigid time partitioning in a real-time operating system while increasing CPU efficiency. This is accomplished by permitting a donor thread to transfer excess or unused CPU budget to a specific beneficiary thread. Additional desirable features will become apparent to one skilled in the art from the foregoing background of the invention and the following detailed description of a preferred exemplary embodiment and appended claims.

SUMMARY OF THE INVENTION

In accordance with the teachings of the present invention, there is provided a method for optimizing CPU budgets associated with at least a first thread and a second thread executable in a time-partitioned real-time operating system. The first thread is executed and has associated therewith a first CPU budget. At least a portion of any unused CPU budget associated with the first thread is transferred to the second thread.

BRIEF DESCRIPTION OF THE DRAWINGS

The present invention will hereinafter be described in conjunction with the appending drawing figures, wherein like reference numerals denote like elements, and.

DESCRIPTION OF THE PREFERRED EXEMPLARY EMBODIMENT

The following detailed description of a preferred embodiment is mainly exemplary in nature and is not intended to limit the invention or the application or use of the invention.

The present invention recognized that dramatic increases in CPU efficiency can be achieved while maintaining the benefits of rigid time partitioning if CPU budget is transferred between threads executing in a time-partitioned real-time environment.

Figure 1:
FIG. 1 is a timing diagram illustrating the CPU budget associated with a Thread A.
Figure 2:
FIG. 2 is a timing diagram illustrating that Thread A utilizes only a portion of its available CPU budget leaving an unused or wasted portion.

FIG. 1 and FIG. 2 illustrate the potential budgeting inefficiencies associated with a time-partitioned real-time operating system. Referring to FIG. 1, a thread (e.g. Thread A) is shown as having a CPU budget 20 within a frame or period occurring between time T1 and time T2. If Thread A utilizes its entire budget 20, no CPU time is wasted. If however, Thread A utilizes only a portion (e.g. two-thirds) of its budget as is shown in FIG. 2 at 22, one-third of Thread A's budget 24 is wasted and lost.

Figure 3:
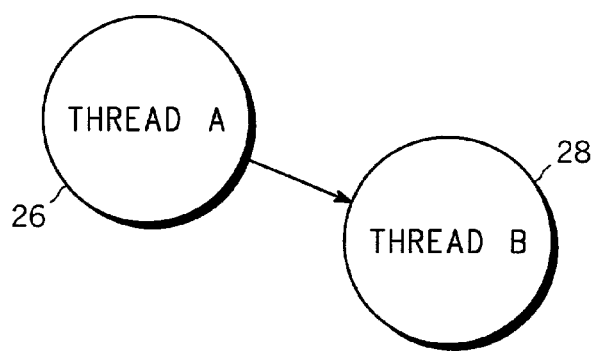
FIG. 3 is a graphical representation of a CPU budget transfer from donor Thread A to beneficiary Thread B.
Figure 4:
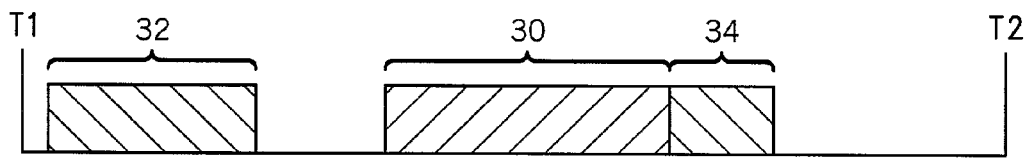
FIG. 4 is a timing diagram illustrating the transfer of Thread A's unused budget to Thread B's budget.

The inventive budget transfer mechanism recognizes that a time-partitioned real-time operating system could be implemented to include a rate-montonic thread-scheduling algorithm, which would permit budget transfers between any two threads. That is, any thread may designate another specific thread as the beneficiary of all or a portion of its unused CPU budget provided that (1) the donor thread has a shorter period than the beneficiary thread, (2) all slower thread rates are even multiples of all faster thread rates, (3) there is a time when the beginnings (or endings) of each thread period align, and (4) the transferred budget is used or transferred before the end of the recipient thread's period. Such a budget transfer mechanism is illustrated in FIG. 3 and FIG. 4. Referring to FIG. 3 and FIG. 4, thread A 26 has designated Thread B 28 as its CPU budget beneficiary. Thread B has its own CPU budget 30 within period or frame T1–T2. As was the case in FIG. 2, Thread A has completed its task in only a fraction (e.g. two-thirds) of its allotted CPU budget shown at 32. However, since Thread A has designated Thread B as its beneficiary, all or a portion of the unused one-third of Thread A's budget 34 is transferred to Thread B 28 and added to Thread B's CPU budget 30 when the execution of Thread A is suspended. Thread B 28 may reside in the same process as Thread A 26, or it might reside in another process.

The transfer of budget occurs when execution of the donor thread is suspended, as for example upon a synchronization object. An event is a synchronization object used to suspend Thread A 26. For example, Thread A 26 and Thread B 28 may be assigned successive tasks in a sequential process. Thus, upon completing its task, Thread A would voluntarily block (stop executing) and voluntarily give up the CPU and allow the operating system to schedule its beneficiary thread before its own next execution. If at that point, Thread A 26 had excess CPU budget, it is transferred to Thread B 28. A semaphore is likewise a synchronization object; however, instead of awakening its beneficiary thread, it waits to be awakened as would be the case, for example, if Thread A 26 were waiting for a resource to become available. A semaphore may also be used to share a number of resources among a larger number of threads.

It might be desirable for the donor to retain a portion of its unused budget when it suspends. For example, the donor thread could suspend but reserve enough budget to signal an error if the recipient thread does not finish its job or send back a response. The reserve amount could be a predetermined minimum (e.g. 10 ms), or a percentage, or a combination of both (e.g. 10 ms or 10%, whichever is greater).

Figure 5:
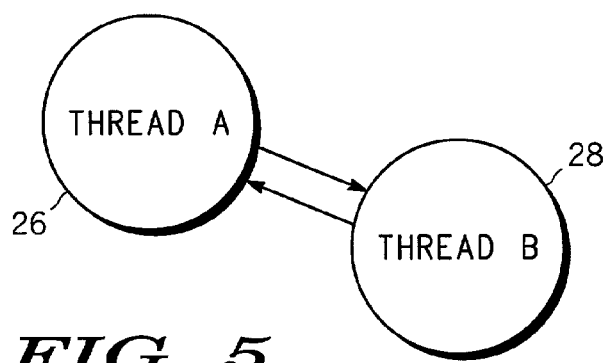
FIG. 5 is a graphical representation of a bilateral transfer of excess CPU budget between Thread A and Thread B.

While the CPU budget transfer shown and described in connection with FIG. 3 and FIG. 4 is a unilateral transfer (i.e. budget is transferred only from Thread A 26 to Thread B 28 when Thread A blocks on a synchronization object), it should be clear that there could be a bilateral transfer of CPU budget between Thread A 26 and Thread B 28. For example, referring to FIG. 5, Thread A 26 transfers its remaining budget to Thread B 28 when Thread A blocks on a first synchronization object (i.e. an event or a semaphore) thus transferring control to Thread B 28. Thread B 28 designates Thread A 26 as its budget beneficiary such that when Thread B 28 blocks on a subsequent synchronization event, Thread B 28 transfers its remaining CPU budget back to Thread A 26.

The inventive budget transfer mechanism permits a plurality of threads designate the same single thread as their budget beneficiary. For example, referring to FIG. 6 and FIG. 7, Thread A 36, Thread B 38, and Thread C 40 are CPU budget donors to Thread D 42. That is, each Thread A, B, and C has designated Thread D as their CPU budget beneficiary as is indicated by arrows 44, 46, and 48 respectively. Thread A has a CPU budget shown as 50 in FIG. 7 but uses only a portion 52 leaving an excess 54. Similarly, Thread B and Thread C have budgets 56 and 58 respectively, of which they utilize only portions 60 and 62 respectively leaving excesses of 64 and 66 respectively. This results in Thread D, having a budget as shown at 68 receives additional budget 70, which is substantially equal to the sum of excess budget portions 54, 64, and 66.

Figure 8:
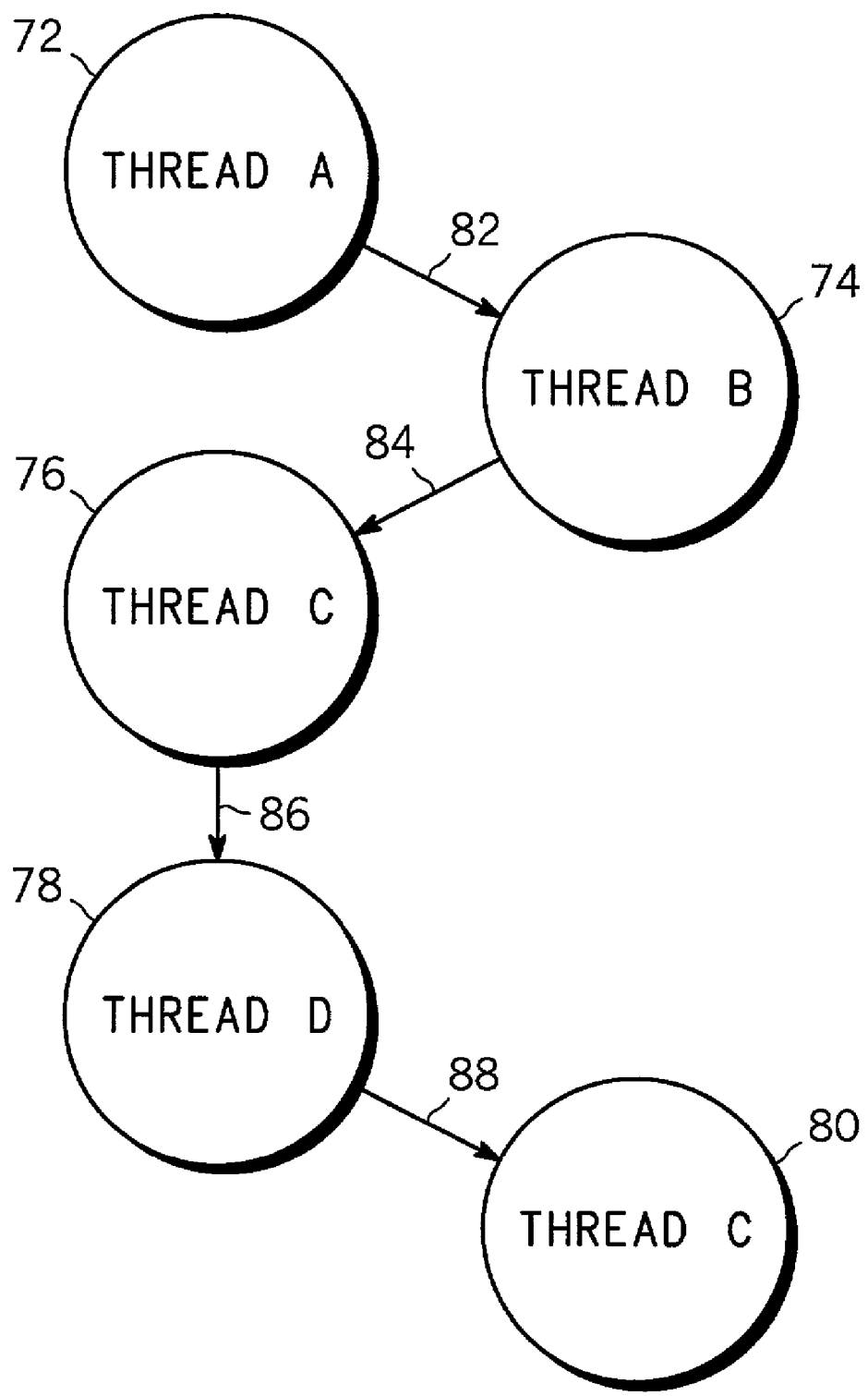
FIG. 8 is a graphical representation of a sequential transfer of unused CPU budget.

Serial thread beneficiary chains are also possible. For example, FIG. 8 shows a system of five threads (i.e. Threads A, B, C, D, and E denoted 72, 74, 76, 78, and 80 respectively) incorporating a sequential transfer of excess CPU budget. That is, Thread A 72 transfers its unused budget, if any, to Thread B 74 as is indicated by arrow 82. Thread B's resulting budget is then comprised of its original budget plus any additional budget transferred by Thread A 72. In a similar fashion, Thread B 74 transfers its unused budget, if any, to Thread C 76 as is indicated by arrow 84. Thus, Thread C's new budget is the sum of its original budget plus any unused budget transferred by Thread B 74. The unused budget of Thread C 76 is transferred to Thread D 78 as indicated by arrow 86, and unused budget of Thread D 78 is transferred to Thread E 80 as is indicated by arrow 88. It should be clear that it is possible that none of Threads A, B, C, or D may have any unused CPU budget to transfer. It should also be clear that any or all of Threads A, B, or C may, in fact, transfer unused budget to the next thread in the sequence; however, this does not guarantee that Thread E 80 will receive any as any excess could be consumed upstream; e.g. by Thread D 76.

Figure 6:
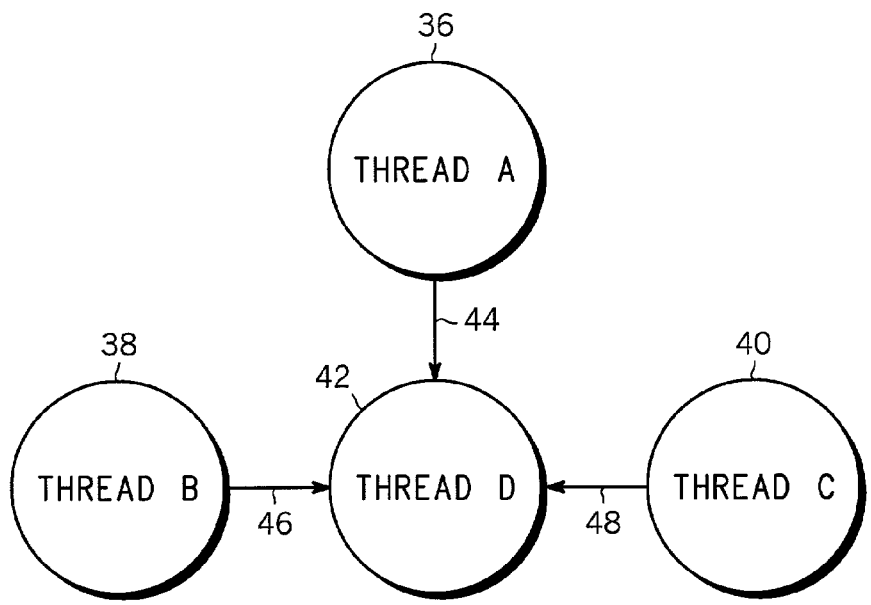
FIG. 6 is a graphical representation of a slack pool implementation wherein Threads A, B, and C contribute unused CPU budget, if any, to Thread D.
Figure 7:
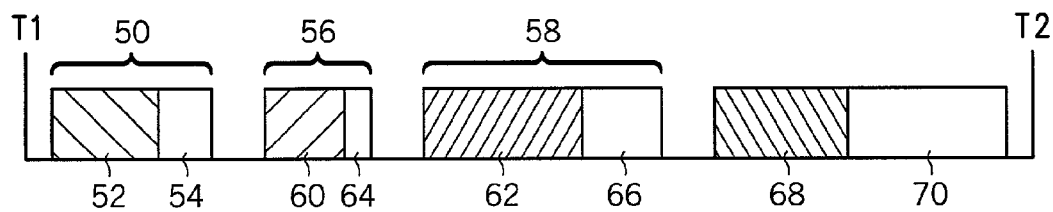
FIG. 7 is a timing diagram illustrating how Threads A, B, and C in FIG. 6 transfer excess CPU budget to Thread D.
Figure 9:
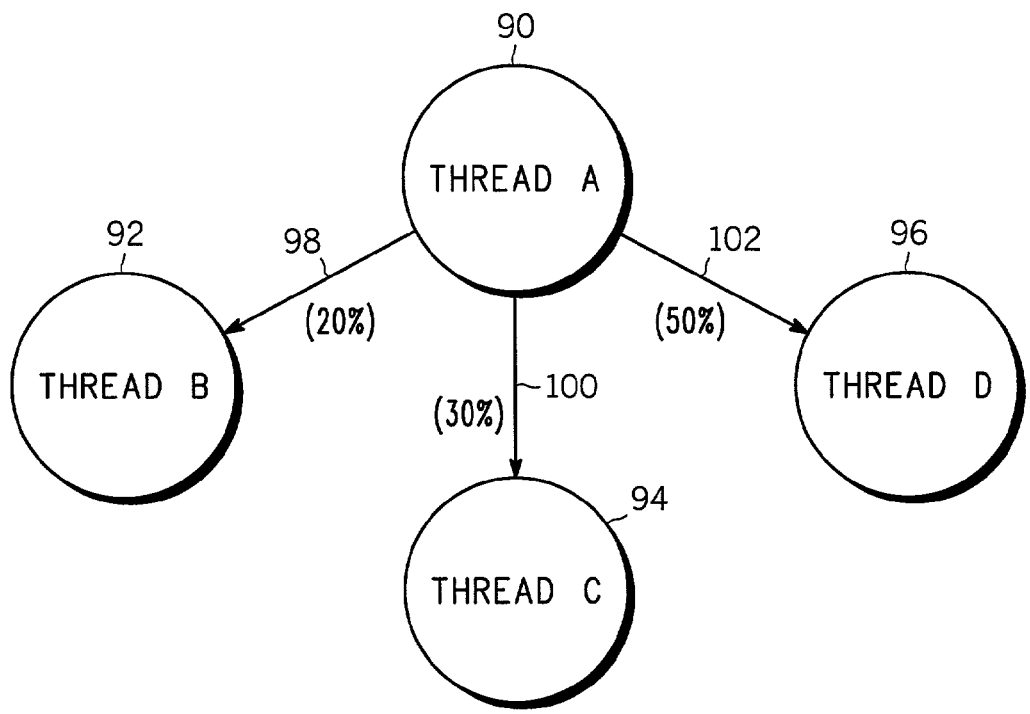
FIG. 9 is a graphical representation illustrating how a donor Thread A transfers predetermined portions of it's unused CPU budget to a plurality of beneficiary threads.
Figure 10:
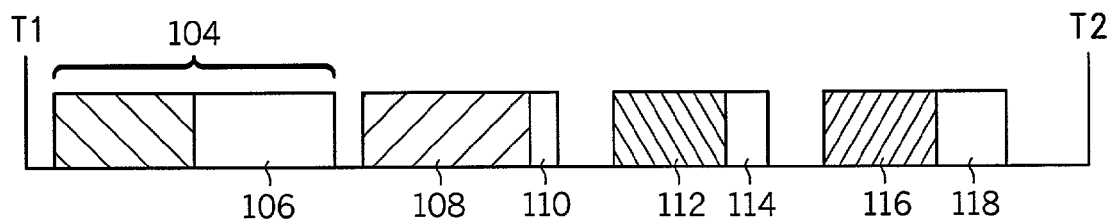
FIG. 10 is a timing diagram illustrating the CPU budget transfers associated with FIG. 9.

FIG. 6 shows a budget transfer scenario wherein a plurality of threads designates the same single thread as their budget beneficiary. It would also be possible to transfer portions of one thread's unused CPU budget to a plurality of other threads as shown in FIG. 9. For example, Thread A 90 could designate Thread B 92 as a beneficiary of twenty percent of its unused budget, as is indicated by arrow 98, Thread C 94 as a beneficiary of thirty percent of its unused budget as is indicated by arrow 100, and Thread D 96 as a beneficiary of fifty percent of its unused budget as is indicated by arrow 102. Referring to FIG. 10, Thread A 90 has a total budget 104 of which a portion 106 is unused. Thread B 92 has a budget 108 and receives ten percent of Thread A's unused budget as is shown at 110. Thread C 94 has a budget 112 and received 30 percent of Thread A's unused budget as is shown at 114. Finally, Thread D 96 has a budget 116 and receives fifty percent of Thread A's unused budget as is shown at 118.

From the foregoing description, it should be appreciated that a method has been provided for maintaining the benefits of rigid time partitioning for increasing CPU efficiency by permitting a donor thread to transfer excess or unused CPU budget time to a designated beneficiary thread. The budget transfers are voluntary, and multiple transfers per period are possible. While the preferred exemplary embodiment has been presented in the foregoing detailed description, it should be appreciated that a vast number of variations in the embodiments exist. It should also be appreciated that this preferred embodiment is only an example, and is not intended to limit the scope, applicability, or configuration of the invention in any way. Rather, the foregoing detailed description provides those skilled in the art with a convenient roadmap for implementing the preferred exemplary embodiment of the invention. Various changes may be made in the function and arrangement described in the exemplary preferred embodiment without departing from the spirit and scope of the invention as set forth in the appended claims.

What is claimed is:

1. A method of optimizing CPU budgets associated with at least a first thread and a second thread executable in a time-partitioned real-time operating system, the second thread a predetermined beneficiary of the first thread, comprising:
    assigning a first CPU budget to the first thread, the first CPU budget occurring within a first period;
    assigning a second CPU budget to the second thread, the second CPU budget occurring within a second period;
    executing the first thread; transferring at least a portion of any unused first CPU budget to the second CPU budget to create a resultant CPU budget assignment to the second thread when the first period is lesser than the second period;
    designating the first thread as a beneficiary of the second thread;
    executing the second thread; and
    transferring at least a portion of any unused resultant CPU budget to the first thread prior to an end of the second period.

2. A method according to claim 1 wherein the step of transferring occurs when the execution of the first thread is suspended.

3. A method according to claim 2 wherein the step of transferring occurs upon the occurrence of a synchronization object.

4. A method according to claim 3 wherein said synchronization object is an event.

5. A method according to claim 3 wherein said synchronization object is a semaphore.

6. A method according to claim 1 further comprising:
    assigning a third CPU budget to a third thread, the third CPU budget occurring within a third period;
    executing the third thread; and
    transferring at least a portion of any unused third CPU budget to the second tread when the third period is lesser than each of the first period and the second period.

7. A method of optimizing CPU budgets associated with at least a first thread and a second thread executable in a time-partitioned real-time operating system, the first thread having a first CPU budget, the second thread a predetermined beneficiary of the first thread, the method comprising:
    executing the first thread;
    reserving a predetermined portion of the first CPU budget for the first thread;
    transferring at least a portion of an unused first CPU budget to the second thread to create a resultant CPU budget associated with the second thread, when the first thread has a shorter period than the second thread;
    designating the first thread as a beneficiary of the second thread;
    executing the second thread; and
    transferring at least a portion of an unused resultant CPU budget to the first thread.

8. A method according to claim 7 further comprising assigning a second CPU budget to the second thread and wherein the at least a portion of an unused first CPU budget is added to the second CPU budget to create the resultant CPU budget assigned to the second thread.

9. A method according to claim 8 wherein the step of transferring occurs when the execution of the first thread is suspended.

10. A method according to claim 8 wherein the step of transferring occurs upon the occurrence of a synchronization object.

11. A method according to claim 8 further comprising:
    assigning a third CPU budget to a third thread;
    executing the third thread; and
    transferring at least a portion of an unused third CPU budget to the first thread.

12. A method of optimizing CPU budgets of a plurality of threads each having a CPU budget and executable in a time-partitioned real-time operating system, the method comprising:
    executing in a sequence each of the plurality of threads;
    transferring at least a portion of an unused CPU budget associated with each one of the plurality of threads to the CPU budget associated with a next thread in the sequence to create a resultant CPU budget associated with the next thread in the sequence when one of the plurality of threads associated with the unused CPU budget has a shorter period than the next thread in the sequence, the next thread in the sequence a predetermined beneficiary of the one of the plurality of threads associated with the unused CPU budget;
    designating the one of the plurality of threads associated with the unused CPU budget as a beneficiary of the next thread in the sequence;
    executing the next thread in the sequence;
    transferring at least a portion of an unused resultant CPU budget associated with the next thread to the one of the plurality of threads associated with the unused CPU budget; and
    repeating said transferring at least a portion of an unused CPU budget step, said designating step, said executing step, and said transferring at least a portion of an unused resultant CPU budget step for each of said plurality of threads.

13. A method according to claim 12 wherein the step of transferring occurs when the execution of a first thread is suspended.

14. A method according to claim 12 wherein each transfer occurs upon an execution of a synchronization object.

15. A method of optimizing CPU budgets of a plurality of donor threads, each having a CPU budget and at least one beneficiary thread each executable in a time-partitioned real-time operating system, the method comprising:
    executing each of the plurality of donor threads;
    transferring at least a portion of at least one unused CPU budget of the plurality of donor threads to a CPU budget of one of the at least one beneficiary thread to create a resultant CPU budget associated with the one of the at least one beneficiary thread when at least one of the plurality of donor threads associated with the at least one unused CPU budget has a shorter period than the at least one beneficiary thread;
    designating the at least one of the plurality of donor threads associated with the at least one unused CPU budget as a beneficiary of the one of the at least one beneficiary thread;
    executing the one of the at least one beneficiary thread; and
    transferring at least a portion of an unused resultant CPU budget associated with the one of the at least one beneficiary thread to the at least one of the plurality of donor threads associated with the at least one unused CPU budget.

16. A method according to claim 15 wherein the step of transferring occurs when the execution of one of the plurality of donor threads is suspended.

17. A method according to claim 16 wherein each transfer occurs upon an occurrence of a synchronization object.

18. A method according to claim 17 wherein the synchronization object is an event.

19. A method according to claim 17 wherein the synchronization object is a semaphore.

20. A method for optimizing CPU budgets of a plurality of beneficiary threads and at least one donor thread having a CPU budget, each beneficiary thread and donor thread executable in a time-partitioned real-time operating system, the method comprising:

executing the donor thread while transferring a predetermined portion of the CPU budget to at least one of the plurality of beneficiary threads to create a resultant CPU budget associated with each of the at least one of the plurality of beneficiary threads when the donor thread has a shorter period than the at least one of the plurality of beneficiary threads;

executing the at least one of the plurality of beneficiary threads;

designating the donor thread as a beneficiary of the at least one of the plurality of beneficiary threads; and transferring at least a portion of an unused resultant CPU budget associated with each of the at least one of the plurality of beneficiary threads to the donor tread.

* * * * *